United States Patent [19]

van der Veer

[11] Patent Number: 4,878,455
[45] Date of Patent: Nov. 7, 1989

[54] DEVICE AND METHOD FOR SUPPLYING, VERY ACCURATELY METERED, A QUANITITY OF FOOD TO SMALL LIVESTOCK

[75] Inventor: Harry M. van der Veer, Heerde, Netherlands

[73] Assignee: Farmtec B.V., Heerde, Netherlands

[21] Appl. No.: 122,173

[22] Filed: Nov. 18, 1987

[30] Foreign Application Priority Data

Nov. 18, 1986 [NL] Netherlands ............... 8602925

[51] Int. Cl.⁴ .............................................. A01K 5/00
[52] U.S. Cl. .................................................. 119/57.5
[58] Field of Search .................. 119/18, 51.11, 51.12, 119/52 AF, 52 B, 56 R

[56] References Cited

U.S. PATENT DOCUMENTS

| | | | |
|---|---|---|---|
| 983,919 | 2/1911 | McGuigan | 119/51.11 |
| 2,538,413 | 1/1951 | Chard | 119/51.11 |
| 3,443,547 | 5/1969 | Ferris et al. | 119/52 B |
| 3,605,698 | 9/1971 | Thyberg | 119/52 B |
| 3,628,506 | 12/1971 | Glasbergen | 119/51.11 X |
| 3,678,902 | 7/1972 | Ruth | 119/51.11 |
| 3,722,475 | 3/1973 | Wittern et al. | 119/52 B X |
| 3,769,937 | 11/1973 | Kenning | 119/52 B |
| 3,776,194 | 12/1973 | Conley | 119/52 B |
| 3,969,997 | 6/1976 | Ruth | 119/51.11 |
| 4,079,699 | 3/1978 | Longmore et al. | 119/51.11 |
| 4,597,361 | 7/1986 | Tudela | 119/52 B |
| 4,628,864 | 12/1986 | Smeltzer | 119/51.11 X |
| 4,712,511 | 12/1987 | Zamzow et al. | 119/52 B X |

Primary Examiner—Robert Peshock
Assistant Examiner—R. Thomas Price
Attorney, Agent, or Firm—Edmund M. Jaskiewicz

[57] ABSTRACT

The invention relates to a method and a device for very accurately metering a quantity by weight of food for being supplied to small livestock, such as poultry, which small livestock is present in a number of cages placed one behind the other. The outflow of food from a foodhopper filled with food, can be stop the moment when is determined that the receiving trough contains a sufficient quantity of food. This quantity of food corresponds to a certain desired quantity of food per animal multiplied by the number of animals to be fed. After the receiving trough has been filled it is emptied for example into a feed trough. The preference the device is provided with a sensor or the like which can scan an indicator which can be fastened to a cage, which indicator emits a signal indicating the number of animals present in that cage.

4 Claims, 2 Drawing Sheets

Fig:1

DEVICE AND METHOD FOR SUPPLYING, VERY ACCURATELY METERED, A QUANITITY OF FOOD TO SMALL LIVESTOCK

FIELD OF THE INVENTION

The invention relates to a method and a device for the very accurate metering of a certain quantity by weight of food, which quantity of food is to be supplied at known times to a number of small livestock, the quantity by weight of food being determined beforehand from the number of small livestock to be fed.

The installations used for the regular supply of animals with food on farms keeping large numbers of small livestock are generally known. In this connection, rearing farms and laying batteries for hens are well known. On farms of this type the small livestock is mostly kept in cages, a limited number of animals being kept in each cage. Farms of this type must operate as economically as possible in order to achieve a good competitive position, and for this reason the quantity of food each animal must receive each time and the frequency at which it must receive the food in a space of 24 hours are determined beforehand in order that the efficiency is as high as possible. On rearing farms and laying batteries hens are mostly kept in a large number of houses arranged in rows one behind the other and each house containing the same number of, for example six, birds. This number may vary from house to house in the long term as a result of, for example, the death of an animal. In order to provide all the animals with the correct quantity of food at the correct point in time feeders are placed in front of the cages.

In general, two systems are used in order to provide all the animals with the required quantity of food as quickly as possible and with the least possible manpower. One system comprises a chain system in which the food is passed through the feeders by means of a type of chain, the links carrying the food along. The food flows from a silo onto the chain and all the food will thus be distributed at the same time over the cages. This system has the drawback that the food does not reach all the hens in the same quantity at the same time. The hens accommodated in the last houses will be able to pick from the food much later than the hens housed directly in the vicinity of the silo, i.e. at the point which the food passes first. Moreover, no account is taken of whether there is a large number or smaller number of hens per food trough. There are therefore always a number of hens which receive comparatively too little food. In order to prevent this an excess of food is distributed along the feeders so that even the last hens may receive sufficient food. However, as a result of this a number of hens receive an excessive quantity of food resulting in lower efficiency.

Another known system comprises a food-distributing carrier which moves along the feeders and which pours out a specific quantity of food for each cage. In this system, the outflow orifice is adjusted so that approximately the required quantity of food falls into the food trough at each cage when the food-distributing carrier is moved along the cages. The food-distributing carrier consist of a supply trough having an outflow orifice at the underside, which is also called a hopper. The outflow orifice cannot, however, be adjusted accurately enough for the food to fall out in the required quantity at every point. Moreover, when all the cages are provided with food and the hopper still contains food, so that the hens have not received the calculated quantity of food, this quantity of remaining food will still have to be supplied to the hens in an additional round. Another is that each cage will receive the same quantity of food in the food trough whereas there may be a smaller number of animals housed in the cage. These hens as a result receive too much food in comparison. The object of the invention is a method and a device with which it is possible to pour out, very accurately, the required quantity of food, determined beforehand, for each cage, the possibilities including, at the same time, that the number of animals contained in each cage is taken into account.

This object is achieved by a method according to the invention, in that food flows out, using first means, of a storage or silo or food hopper filled with food at a rate more or less determined beforehand, in that the outflowing food is received in a trough, in that the point in time when the receiving trough contains a certain, required quantity of food is determined with second means, in that, as soon as the receiving trough contains the required quantity of food, the flow of food is stopped, in that thereafter the receiving trough is emptied, by third means, at, for example, a certain required time or place and in that the first means are then reactivated as a result of which the flow of food again flows out of the food hopper and the cycle is repeated. With a method of this type the required quantity of food can quickly be determined very accurately at any time and poured into the feeder for the small livestock. As a result it is possible to supply each cage each time very precisely with the required quantity of food. A method of this type can be carried out with a device according to the invention, in that the device comprises a frame to which is fastened a storage silo or food hopper, first means capable of flowing a flow of food out of the hopper, the device being provided with a receving trough in which the outflowing food can be recieved, in that the device comprises second means with which the point in time at which the receiving trough contains a certain required quantity of food is determined, in that the weighing means can emit a signal which stops the flow of food flowing out of the hopper, and in that the receiving trough can be emptied, for example tilted, by third means, and in that the said device can be moved along the cages.

In a preferred embodiment of the device according to the invention the device is provided with a sensor with which an indicator can be read off, this indicator showing the number of food units to be poured out for a specific cage and the cage may be provided for this purpose with the above indicator. By providing each cage an adjustable indicator it is always possible during the movement of the device along the cages to adjust the required quantity of food to be placed in the feeder of a specific cage. It is possible as a result to provide each cage with a quantity of food which corresponds precisely with the quantity required for each animal so that the operation is optimally economical.

BRIEF DESCRIPTION OF THE DRAWINGS

The invention will be illustrated in detail by reference to the drawing, in which:

In FIG. 1, a cage 1 of a laying battery is shown in cross-section, having a feeder 2. Each cage is provided at the front side with a cage door 3. The device for feeding the small livestock is shown in front of the cage door. This device consists of a house or frame 4 which can be moved along a rail 5. At the top of the house 4 a storage silo 6 is attached and provided at the underside with an outflow orifice 7. A storage silo 6 of this type is also called a food hopper. Downstream from the outflow orifice the hopper 6 has the shape of a funnel and a food-distributing roll 8 is placed in the slit-shaped outflow orifice 7. This food-distributinig roll 8 comprises a bar over the entire length of the outflow orifice and rotatably mounted near the extremities 9, 10. The bar or metering roll 8 is provided with small projections 11 which can always carry along small quantities of food when the roll 8 is turned round. The roll 8 can be turned round by means of an electric motor 12. By interrupting the current supply of the motor 12 the motor can be stopped and the flow of food thus stopped. A receiving trough 13 fastened to a shaft by means of two arms 14 is arranged under the place where the food falls downwards out of the hopper 6. The shaft 15 is rotatably fastened in the house 4 at points 16, 17. Two counterweights 18 are fastened to one arm 19 and are used to rotate the small trough 13 upwards about the shaft 15 if the small receiving trough is empty. The counterweights are chosen such that, above a certain weight, the small trough has a larger moment relative to the shaft 15 than the counterweights, this certain weight being set at a value of a quantity of food in the small trough corresponding to, for example, the quantity of food to be fed to two animals.

Figure 1:
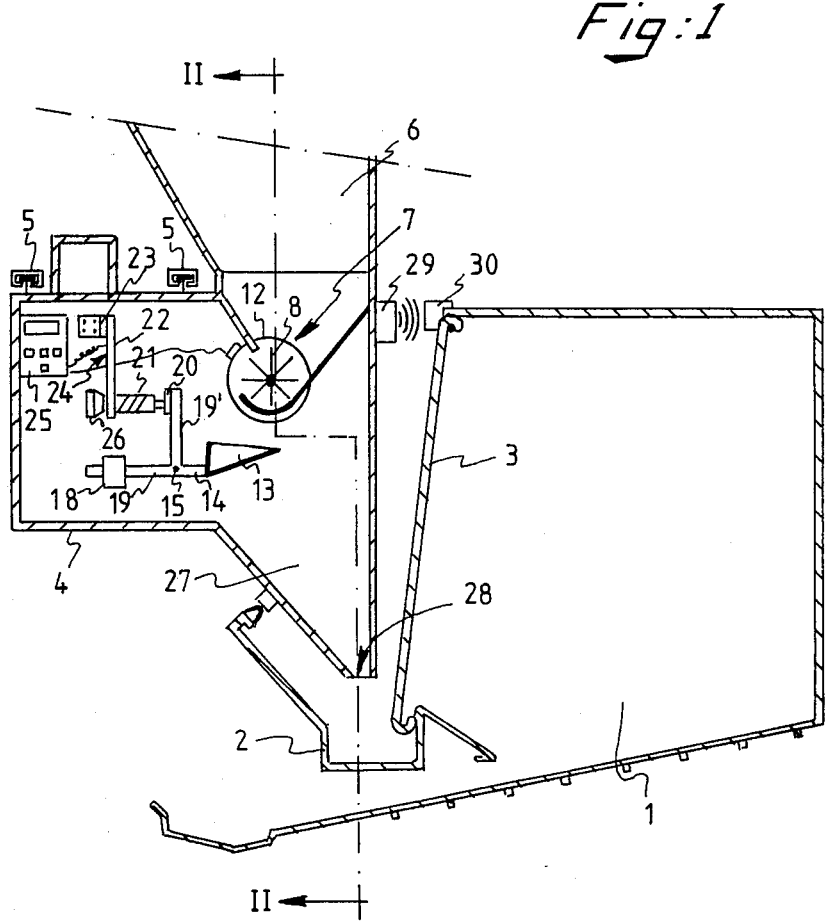
FIG. 1 shows a cross-section through a cage of a laying battery with a feeding device according to the invention, also in a cross-section.
Figure 2:
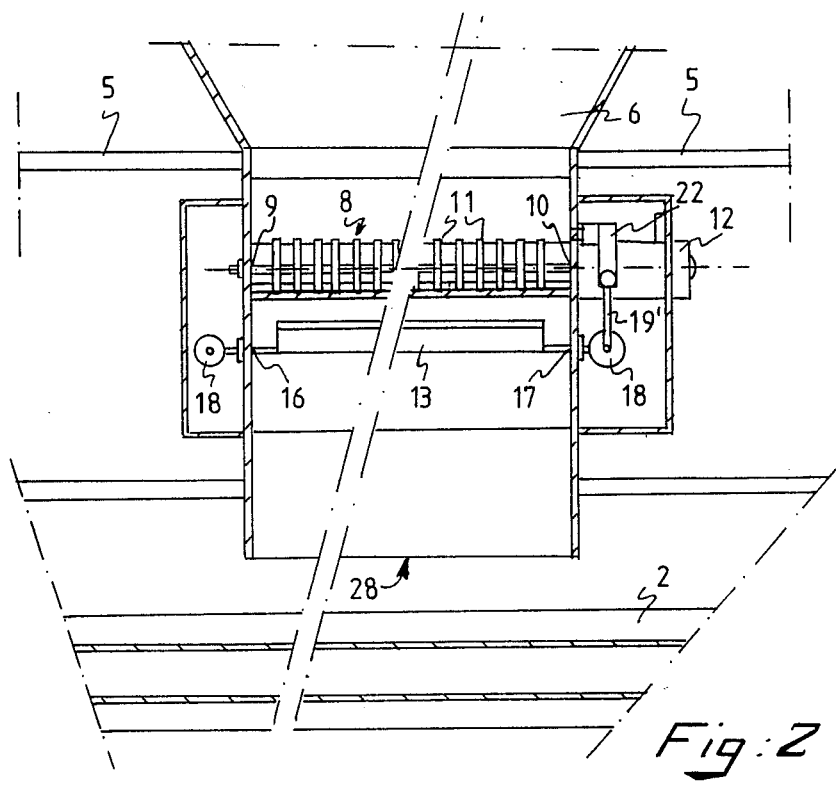
FIG. 2 shows a cross-section of the feeding device according to the invention along the line II—II in FIG. 1.

An arm 19, to which a small iron plate 20 capable of interacting with an electromagnet 21 is attached, is fastened to the member comprising the receiving trough 13, the shaft 15 and counterweights 18 with the various arms. The said elecrtomagnet 21 is fastened near the extremity of a bar 22 the other extremity 23 of which is permanently fastened to the house or frame 4. A strain guage 24 is fastened onto the bar 23. The signal emitted by the strain gauge is pased to a microprocessor 25 which compares the signal with a set signal. As soon as the set signal and the emitted signal from the strain gauge correspond to each other the supply of current to the motor 12 is interrupted as a result which the food-distributing roll 8 will stop.

To prevent the bar 22 with the strain gauge 24 from sagging too far when the receiving trough 13 rotates back into the rest position a stop 26 attached to the house, on the other side of the bar 22 at the position where the electromagnet 21 is attached. When the receiving trough 13 is filled with the quantity of food and the signal derived from the strain gauge 24 has stopped the food flow by means of the microprocessor 25 the small receiving trough 13 will still always be in the uppermost position because the member is held in this position by means of the electromagnet 21. As soon as the electromagnet is no longer energized the small receiving trough 13 will rotate about the shaft 15 as a result of the weight of the food present in the small receiving trough 13, and the food will be poured out into a funnel 27 opening into a slit 28. The width of the receiving trough 13 and hence of the slit 28 preferably corrsponds to the width of a cage 1. As soon as the device is in the correct position above the feeder 2 the food will be poured out. Near the top of the device on the house 4 a sensor 29 is attached which is capable of interacting with an indicator 30 which indicator 30 emits a signal indicating the number of animals present in the next cage. Thereafter, the sensor 29 will emit a signal to the microprocessor 25 as a result of which the latter will adjust itself so that the correct weight of food will be poured out into the receiving trough 13.

The microprocessor 25 can be set beforehand to the desired quantity of food which each is to receive each time. This is often dependent on the position of the cages. Birds near the outer side of the sheds containing the cages are usually in cooler air than birds present in the middle of the battery. In general, animals at cooler places must receive more food than animals at warmer places. This can be taken into account by means of the microprocessor. The microprocessor can be set beforehand to the quantity of food to be distributed to each animal in each row of cages. A signal can then be emitted by the sensor 29 to the sensor which signal indicates the number of animals in the next-following cage; the microprocessor can consequently determine which signal belongs to the total weight to be compared with the signal derived from the strain gauge. The receiving trough is thereafter filled with food until it contains the desired quantity of food. The microprocessor is to be calibrated beforehand in connection with the strain gauge.

Figure 3:
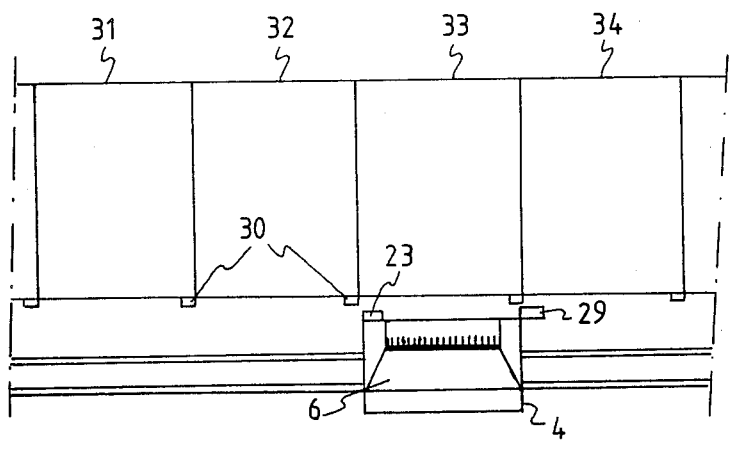
FIG. 3 shows cages.

FIG. 3 shows part of a laying battery with a number of cages 31, 32, 33, 34, each cage containing a different number of hens. If cage 31 contains, for example, six hens, cage 32 five hens and cage 33 four hens, then the quantities of food to be deposited in the feeder for each cage must also relate to each other as 6:5:4. The ratio to be fed to the microprocessor can then be given by the indicator 30 attached to the outer side of each cage. These are to be adjusted if the number of hens in a cage changes. The correct moment at which the receiving trough is to be emptied can be determined by means of a microswitch 35 which fastened to the outer side of the cage and can be operated by a projection, in this case the indicators 29. The current supply to the electromagnet can be interrupted by the microswitch. By correctly positioning the microswitch it is also possible to set the correct moment for emptying the receiving trough.

The embodiments of the invention in which an exclusive property or privilege is claimed are defined as follows:

1. An animal feeding device comprising a frame movable along a sequence of cages disposed side-byside each having a feeder and comprising a food hopper having a discharge orifice, means in said discharge orifice for supplying food therefrom, a receiving trough in said frame below said discharge orifice and disposed to receive food supplied therefrom, said receiving trough being movable into a dumping position, means for retaining said receiving trough in a position to receive said supplied food, means for indicating when said receiving trough has received a predetermined quantity of food corresponding to the quantity of food desired for each animal multiplied by the number of animals within a said cage, means responsive to said indicating means for stopping the supply of food to said receiving trough, and means for actuating said retaining means such that said receiving trough moves to the position to dump food into said feeder, said indicating means comprises a bar having one end connected to said frame and a second end, said receiving trough being retained against said second end of said bar, and a strain gauge mounted on said bar to emit a signal corresponding to the degree of bending of said bar as an indication of the weight of food in said receiving trough.

2. An animal feeding device as claimed in claim 1 wherein said receiving trough is pivotally mounted and has an arm extending therefrom, a metal plate on said arm, said retaining means comprising an electromagnet coacting with said metal plate.

3. An animal feeding device as claimed in claim 1 and further comprising means on each cage for indicating the number of animals present in that cage and for emitting a signal indicative of said number of animals, and sensor means on said frame for scanning said indicating means.

4. An animal feeding device as claimed in claim 2 and further comprising a cam on each cage, and a microswitch on said frame engagable with said cam and connected to said electromagnet to de-energize said electromagnet at that time that the receiving trough is to be emptied for a said cage.

* * * * *